(12) United States Patent
Olson (10) Patent No.: US 9,584,363 B1
(45) Date of Patent: Feb. 28, 2017

(54) REDUNDANT STORAGE SOLUTION

(71) Applicant: SOFTNAS, LLC, Houston, TX (US)

(72) Inventor: Eric Olson, Melbourne, FL (US)

(73) Assignee: SOFTNAS, LLC., Houston, TX (US)

( * ) Notice: Subject to any disclaimer, the term of this patent is extended or adjusted under 35 U.S.C. 154(b) by 147 days.

(21) Appl. No.: 14/538,579

(22) Filed: Nov. 11, 2014

Related U.S. Application Data (60) Provisional application No. 61/902,776, filed on Nov. 11, 2013.

(51) Int. Cl.
| | | |
|---|---|---|
| *G06F 11/00* | (2006.01) | |
| *H04L 12/24* | (2006.01) | |
| *G06F 11/20* | (2006.01) | |
| *H04L 12/741* | (2013.01) | |
| *H04L 29/08* | (2006.01) | |

(52) U.S. Cl.
CPC ...... *H04L 41/0668* (2013.01); *G06F 11/2007* (2013.01); *G06F 11/2023* (2013.01); *G06F 11/2033* (2013.01); *G06F 11/2092* (2013.01); *G06F 11/2094* (2013.01); *H04L 45/745* (2013.01); *H04L 67/10* (2013.01)

(58) Field of Classification Search
CPC ............. G06F 11/2092; G06F 11/2007; G06F 11/2033; G06F 11/2094; G06F 3/0683
See application file for complete search history.

(56) References Cited

U.S. PATENT DOCUMENTS

| | | | | |
|---|---|---|---|---|
| 7,260,737 | B1* | 8/2007 | Lent | G06F 11/2092 714/5.11 |
| 8,839,043 | B1* | 9/2014 | Long | G06F 11/2092 714/43 |
| 2003/0021223 | A1* | 1/2003 | Kashyap | H04L 41/0663 370/217 |
| 2015/0370668 | A1* | 12/2015 | Nazari | H04L 41/0668 714/6.3 |
| 2016/0050282 | A1* | 2/2016 | Olson | H04L 67/16 709/201 |

* cited by examiner

*Primary Examiner* — Charles Ehne
(74) *Attorney, Agent, or Firm* — Polsinelli PC (57) ABSTRACT

Method and apparatus for switching between a first server and a second server, each located within a virtual private cloud and the first server being located within a first zone and the second server being located within a second zone that is physically separate from the first zone. The method and apparatus further configured to determine that the first server has experienced a failure to send or receive data. The method and apparatus further configured to enable a second port on the second server. The method and apparatus further configured to create a new route table at the second server and flush the previous route table. The method and apparatus further configured to transmit, via the second port, a request to a virtual private cloud controller to update an elastic internet protocol address with the second port information and receive data from the virtual private cloud controller.

17 Claims, 5 Drawing Sheets

REDUNDANT STORAGE SOLUTION

CROSS-REFERENCE TO RELATED APPLICATION

This application claims priority to U.S. Provisional Application No. 61/902,776, filed Nov. 11, 2013, entitled Redundant Storage Solution, which is entirely incorporated by reference herein.

FIELD

The subject matter herein generally relates to providing redundant storage solutions.

BRIEF DESCRIPTION OF THE DRAWINGS

Implementations of the present technology will now be described, by way of example only, with reference to the attached figures, wherein.

DETAILED DESCRIPTION

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The term coupled is defined as directly or indirectly connected to one or more components. The term server can include a hardware server, a virtual machine, and a software server.

The present technology is configured to comprise two or more servers located within a Virtual Private Cloud (VPC). Two of the two or more servers are located within different zones within the VPC. For example, the VPC can be defined within a particular area, but the two servers are located some distance apart. In at least one embodiment, there are two servers each having a corresponding zone. In at least one implementation, the zone is an availability zone. In other embodiment, the two servers can be located within the same zone. The present technology comprises at least two servers that are configured such that they are configured such that one of the servers is a primary server and the other server is a backup or redundant server, such that all of the data that is present on the first server is also present on the second server. For example, the second server can be a mirror storage device of the first server.

The present technology is configured to provide a seamless failover in the event that the first server is not able to send and/or receive data, with a client device; the communication from the client device is routed over to the second device. In at least one implementation, the switch over to the second server is such that it can be made such that there is no disruption of communication from the client to data stored on the two servers.

In at least one embodiment, the present technology can be implemented as a software or a hardware module. In at least one embodiment, the present technology causes a processor to execute instructions. The software module can be stored within a memory device or a drive. The present technology can be implemented with a variety of different drive configurations including Network File System (NFS), internet Small Computer System Interface (iSCSi), and Common Internet File System (CIFS). Additionally, the present technology can be configured to run on VMware ESXi (which is an operating system-independent hypervisor based on the VMkernel operating system interfacing with agents that run on top of it. Additionally, the present technology can be configured to run on Amazon® Web Service in VPC.

In at least one embodiment, the present technology is configured to provide for a method of switching between a first node and a second node, each located within a virtual private cloud, where the first node is located within a first zone and the second node is located within a second zone that is separate from the first zone, the nodes each comprising pools and volumes. In at least one embodiment, the method comprises determining at the second node that the first node has experienced a failure to send or receive data, enabling a second port on the second node, creating a new route table at the second node, flushing the previous route table, transmitting via the second port a request to a virtual private cloud controller to update an internet protocol address with the second port information, and receiving via the second port data from the virtual private cloud controller. In one embodiment, the request to a virtual private cloud controller to update an internet protocol address with the second port information utilizes a load balancer. In one embodiment, the second zone is physically separate from the first zone. In another embodiment, the second zone is logically separate from the first zone.

In at least one embodiment, the method further comprises automatically discovering the information present on both nodes necessary to achieve replication, including at least determining which storage pools and volumes need to be replicated. In some embodiments, the determination may further include automatically discovering storage pools on the nodes that have the same name, automatically discovering the volumes in each such storage pool, automatically configuring tasks necessary for each volume to be replicated, automatically determining whether a full back-up or synchronization from the first node to the second node of all storage pools and volumes in the source node is necessary, and upon such determination, executing the full back-up or synchronization from the first node to the second node of all storage pools and volumes in the source node.

In at least one embodiment, the method further comprises performing a snap replication once per a first predetermined period, the snap replication comprising synchronizing data on the first node to the second node which has changed within a second predetermined period. In at least one embodiment, the method further comprises providing access to the first node or the second node via a user-interface. In one embodiment, the user-interface is an application programming interface. In another embodiment, the user-interface is a complete packet inspection interface.

In at least one embodiment, the method further comprises authorizing two-way communication between the nodes via at least one secure shell. In at least one embodiment, the method further comprises authorizing two-way communication between the nodes via at least one secure network connection. In one embodiment, the secure network connection is via TCP/IP. In another embodiment, the secure network connection is via secure shell.

In at least one embodiment, the present technology is configured to provide for a method of switching between a first node and a second node, each located within a virtual private cloud, where the first node is located within a first zone and the second node is located within a second zone that is physically separate from the first zone, the nodes each comprising pools and volumes. In at least one embodiment, the method comprises determining at the second node that the first node has experienced a failure to send or receive data, enabling a second port on the second node, creating a new route table at the second node, flushing the previous route table, transmitting via the second port a request to a virtual private cloud controller to update a load balancer with the second port information, and receiving via the second port data from the virtual private cloud controller.

In at least one embodiment, the present technology is configured to provide for a virtual private cloud configured to be connected to the internet via a hypertext transfer protocol server, the virtual private cloud comprising a first server comprising a first network interface card and a second network interface card and a second server comprising a first network interface card and a second network interface card. In one embodiment, the second server is configured to be communicatively coupled to the first server to provide for a redundant file system and the first network interface card on the first server is configured to be coupled to the first network interface card on the second server. In at least one embodiment, the second server is configured to determine that the first server has experienced a failure to send or receive data, enable a second port on the second server, create a new route table at the second server, flush the previous route table, transmit via the second port a request to a virtual private cloud controller to update an elastic internet protocol address with the second port information, and rescue via the second port, data from the virtual private cloud controller.

Figure 1:
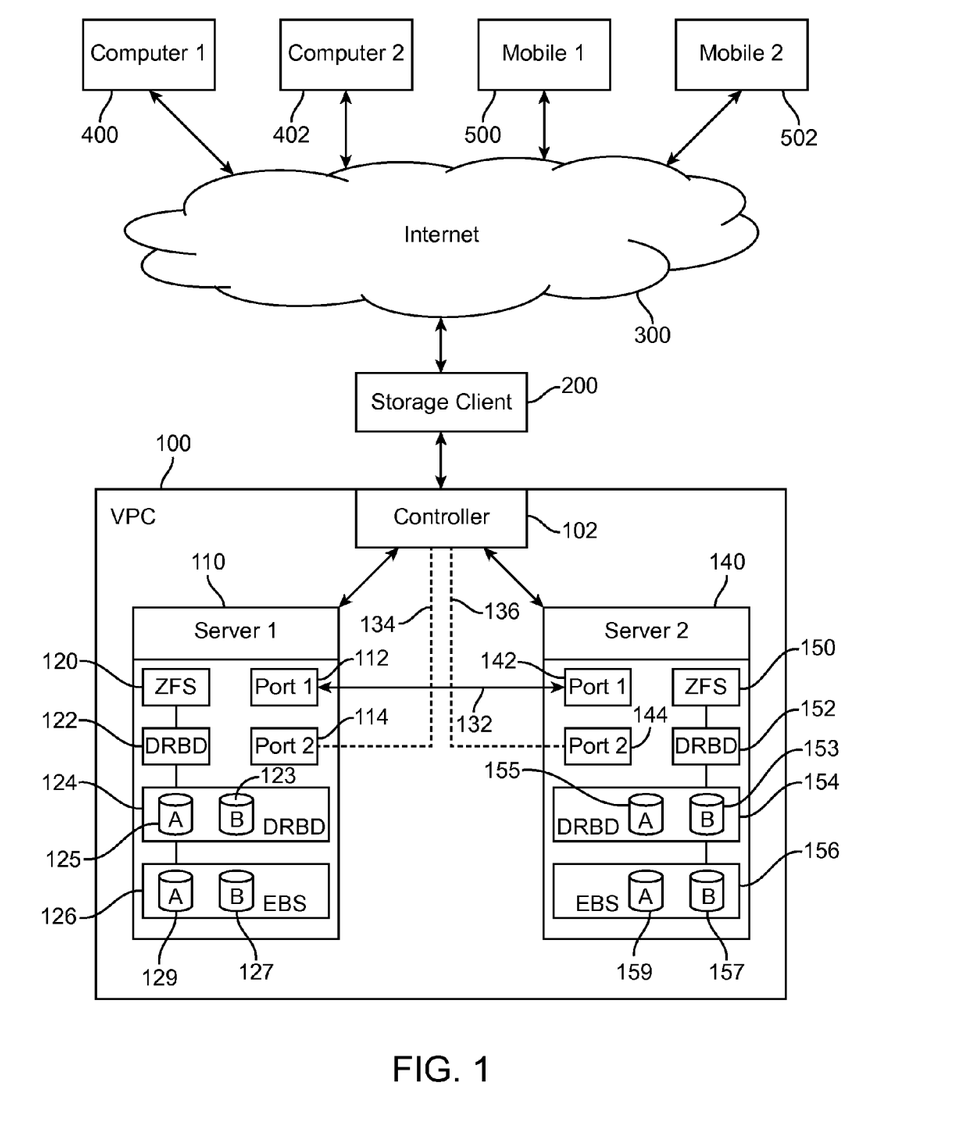
FIG. 1 is an example of a possible system architecture implementing the currently disclosed subject matter.

The present technology is configured to provide for seamless cross-zone failover. As illustrated in FIG. 1, an example of the present disclosure is illustrated. A VPC 100 is illustrated. The VPC 100 comprises a controller 102. The controller 102 can control the first server 110 and the second server 140. While only two servers are illustrated in the present example, the technology can be implemented with two or more servers. The illustration of only two servers is provided to simplify the presentation of information. The controller can be communicatively coupled to a storage client 200. The storage client 200 can be a web server, for example a hypertext transfer protocol (HTTP) server. In other embodiments, other types of storage clients can be implemented. In other embodiments, the storage client 200 can be configured to allow for pass through of data and not necessary provide for storage. The storage client or other device can be communicatively coupled to the internet 300. Additionally, as illustrated, there are several client devices that connect to the storage client 200 through internet. The client devices can include a first computer 400 and a second computer 402. The client devices can further include a first mobile device 500 and a second mobile device 502. Other devices that need access to storage client 200 are also considered within this disclosure. The other devices can include tablets, laptops, servers, navigation devices, electronic systems within an automobile, and other special purpose devices.

The first server 110 can comprise a first communication port 112 and a second communication port 114. The first communication port 112 and the second communication port 114 can be any interface that is designed to communication with a corresponding communication interface on another device that allows for communication between the devices. In one example, the first communication port 112 and the second communication port 114 can be network interface cards (NICs). In other configurations the first communication port 112 and the second communication port 114 can be other devices that allow for transfer of data including universal serial bus, Ethernet, optical data cards, and the like. While the first communication port 112 and the second communication port 114 can be the same type of port, in other implementations, the ports 112, 114 can be different.

The second server 140 can comprise a first communication port 142 and a second communication port 144. The first communication port 142 and the second communication port 144 can be any interface that is designed to communication with a corresponding communication interface on another device that allows for communication between the devices. In one example, the first communication port 142 and the second communication port 144 can be network interface cards (NICs). In other configurations the first communication port 142 and the second communication port 144 can be other devices that allow for transfer of data including universal serial bus, Ethernet, optical data cards, and the like. While the first communication port 142 and the second communication port 144 can be the same type of port, in other implementations, the ports 142, 144 can be different.

As illustrated the first communication port 112 of the first server 110 can be configured to be communicatively coupled with the first communication port 142 of the second server 140. The communicative coupling of the first server 110 with the second server 140 allows for data to be transferred between the first server 110 and the second server 140. This allows for the data on the second server 140 to be a mirror of the data on the first server 110, thereby providing a backup to the data on the first server 110.

The controller 102 can be configured to direct data traffic to the first server 110 or the second server 140 based upon an elastic internet protocol address (EIP).

The first server 110 can further include a zone file system (ZFS) 120. ZFS can be used to send and receive data for asynchronous replication. ZFS can be configured to communicate with a distributed replicated block device (DRBD) 122 on the first server 110. The DRBD 122 can be configured to communicate with DRBD devices 124 such as a first disk device A 125 and a second disk device B 123. Additionally, the server can comprise an elastic block storage (EBS) 126. The EBS 126 can comprise a first volume A 129 and a second volume B 127. The EBS first volume A 129 can be communicatively coupled to the first disk device A 125. The EBS second volume B 127 can be communicatively coupled to the second disk device B 123.

The second server 140 can further include ZFS 150. The ZFS can be configured to communicate with a DRBD 152 on the first server 110. The DRBD 152 can be configured to communicate with DRBD devices 154 such as a first disk device A 155 and a second disk device B 153. Additionally, the server can comprise an EBS 156. The EBS 156 can comprise a first volume A 159 and a second volume B 157. The EBS first volume A 159 can be communicatively coupled to the first disk device A 155. The EBS second volume B 157 can be communicatively coupled to the second disk device B 153.

In normal operation, the first server 110 is communicatively coupled to the controller 102 via a second port 114 over communication channel 134. Additionally, data that is being accessed at the first server is stored on the first disk device A 125 and the first volume 129. This data is replicated to the second server 140 via the first ports 112, 142 over communication channel 132. The replicated data is stored on the second server 140 in the first disk device A 155 and first volume A 159. The data stored on the second disk device B 123 and the second volume 127 is the backup or replication of the data on second server 140 on second disk device B 153 and the second volume 159.

When the second server 140 detects that the first server 110 has lost communication, the second server enables the second port 144 to communicate with the controller 102 via communication channel 136. The second server 140 sends information to the controller 102 to update the EIP so that communication can flow to the second server 140 instead of the first server 110. As described below, the transformation of the EIP can be as a result of the second server 140 creating a new route table and flushing the old route table. Once the EIP is updated, the data that was originally being directed towards the first server 110 is directed to the first disk device 155 and the first volume 159, so that the client devices do not experience any delay in accessing or storing data and the data set remains complete.

While the above has used volumes and disk devices to describe the EBS and DRBD devices, these terms can refer to one or more files or one or more devices. Additionally, the controller 102 has been described within the VPC 100; however the controller 102 can be located outside of the VPC. While the above has been described in relation to servers, other types of structures are considered within this disclosure.

Figure 2:
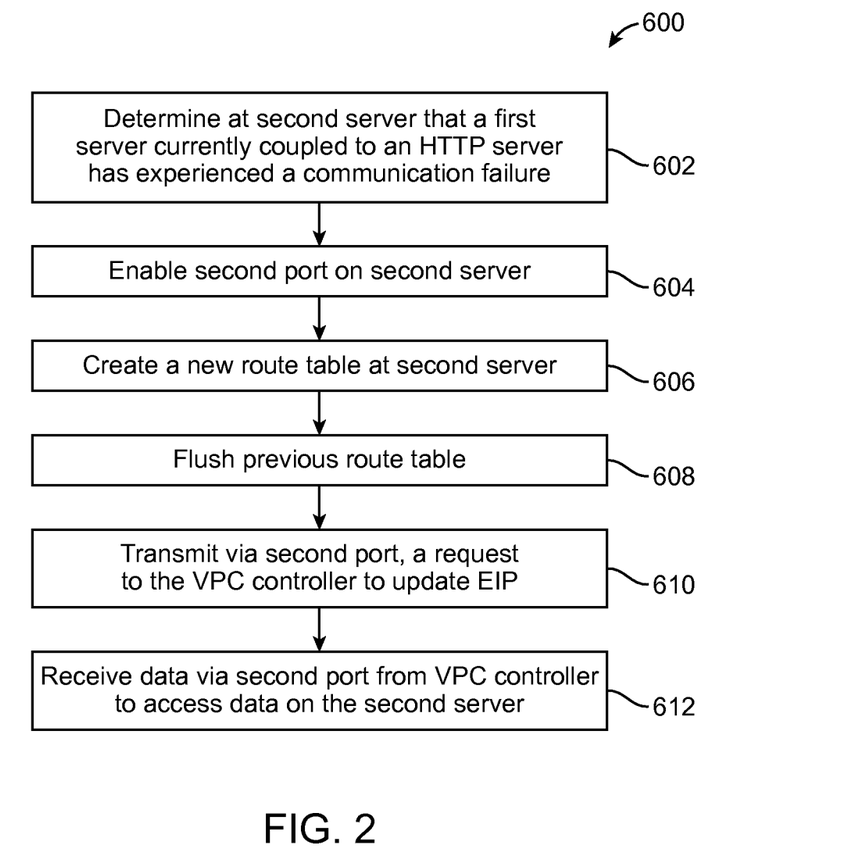
FIG. 2 is an example of a method according to the present disclosure.

The present disclosure also includes a method 600 as illustrated with respect to FIG. 2. As illustrated, the method includes several steps. The steps illustrated are for illustration purposes and other steps can be implemented. Additionally, while a particular order is illustrated in FIG. 2, the present technology can be implemented in other arrangements such that the order of the steps can be different than that as illustrated. Furthermore, the present technology can include steps that are not illustrated and other embodiments can be such that one or more of the steps are removed. The method is described in relation to two servers, which can be any device as described above. For example, the servers as described below can be network attached storage devices.

The method comprises determining at a second server that a first server currently communicatively coupled to client storage device, such as an HTTP server, has experienced a communication failure (block 602). This determination can be made when the second server does not receive communication from the first server as the first server and the second server can be communicatively coupled to one another over a first set of ports (one on each server).

The method can further comprise enabling a second port on the second server (block 604). The enabling the second port can be in response to the determination that the first server experienced a communication failure.

The method can further comprise creating a new route table at the second server (block 606). The new route (or routing) table can include information to route data that was previously routed to the first server to the second server. The route table can contain other information that is necessary to route data to the right location.

The method can further comprise flushing previous route (routing) tables (block 608). Additionally, the method can insert the new route tables in place of the flushed route tables.

The method can further include transmitting, via the second port, a request to the VPC controller to update EIP (block 610).

The method can further include receiving data via the second port from the VPC controller at the second server where the data communication would have been previously directed to the first server (block 612).

Figure 3:
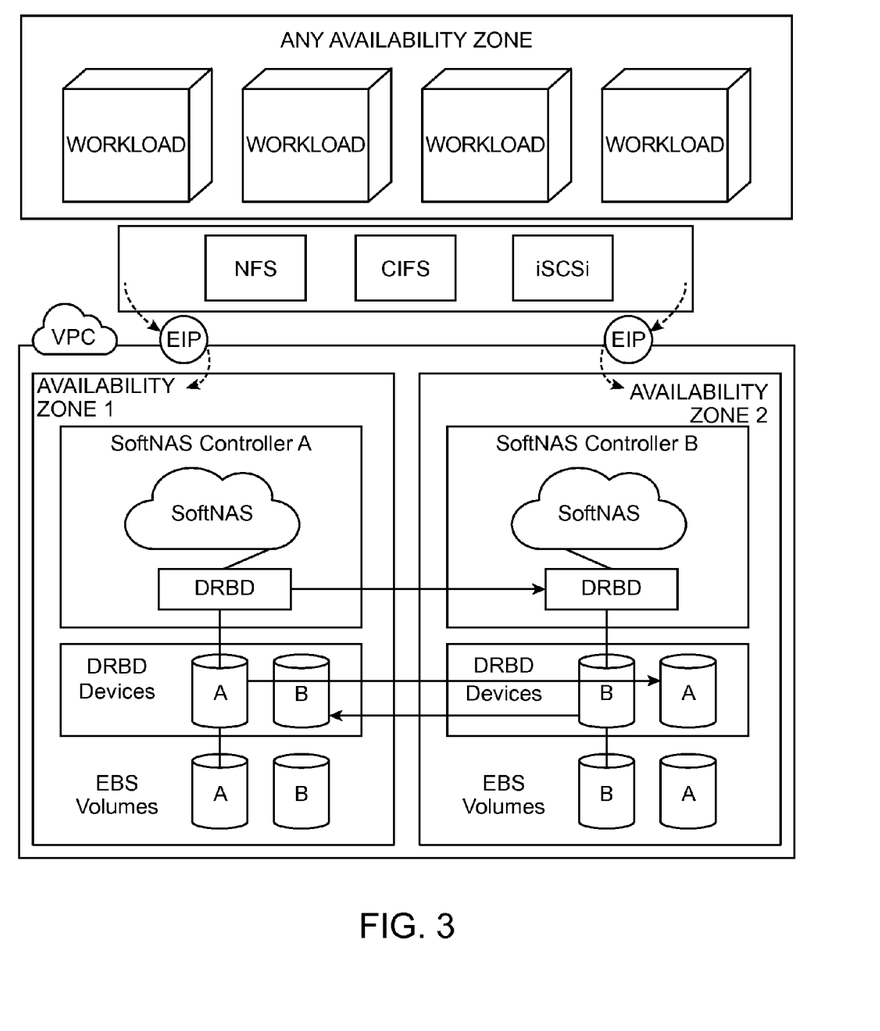
FIG. 3 is an example of a particular implementation according to the present technology prior to failover.

FIG. 3 illustrates an example of the present technology operating within a specific configuration. Additionally, the workload can come from outside of the availability zone and be directed towards any availability zone. The examples of file structures illustrated can be NFS, CIFS, iSCSi or the like as described above. As shown the data can be directed towards both the first availability zone and second availability zone. The data can be stored at drive set A within the first availability zone or on drive set B within the second availability zone 2. The data from the drive set A is communicated to the second availability zone via DRBD. The data from the drive set B is transferred from the second availability zone to the first availability zone by DRBD. This allows the data within the first availability zone to match the data within the second availability zone. As the client computer accessing the data does not know which location the data is being stored, the data is stored within the VPC. The location of the data is controlled by the EIP.

Figure 4:
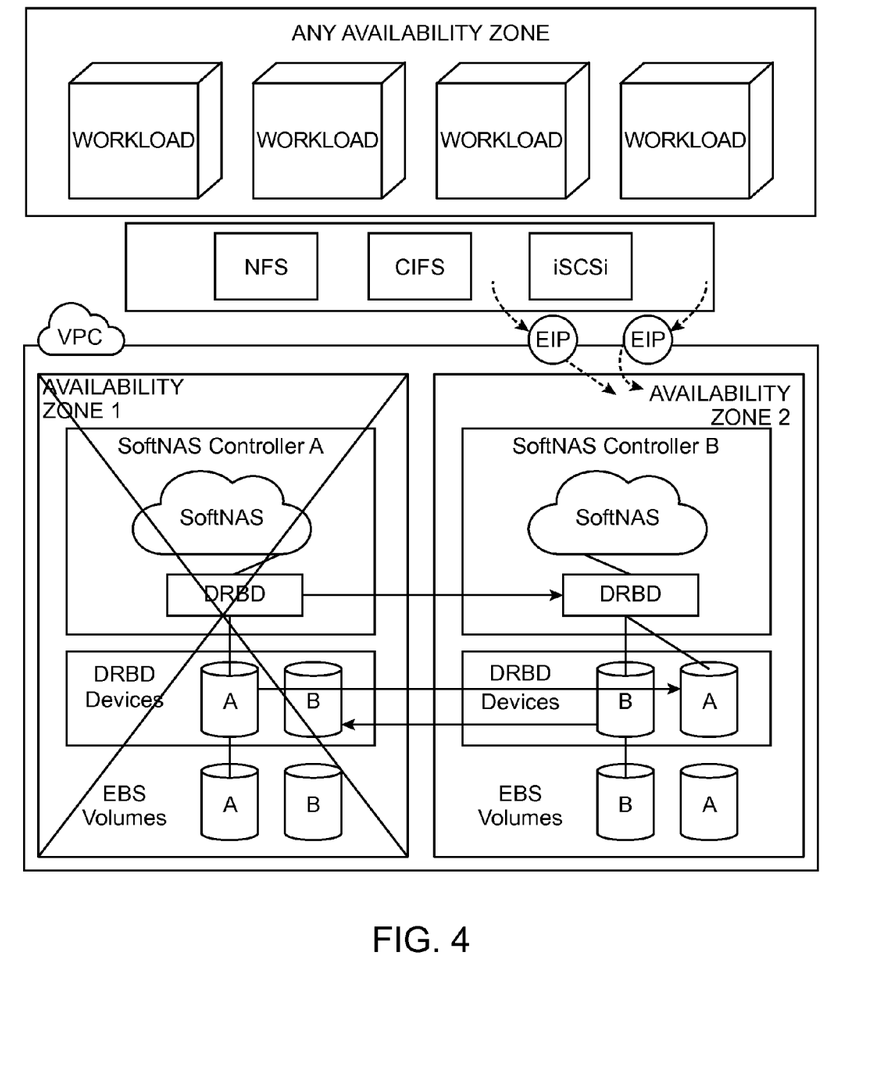
FIG. 4 is an example of a particular implementation according to the present technology after failover.

FIG. 4 illustrates the situation in which the controller within the first availability zone has lost communication with the controller within availability zone 2 and the client. In this case, the EIPs are both routed to controller B within the second availability zone. This can be handled according to the above described procedures.

Figure 5:
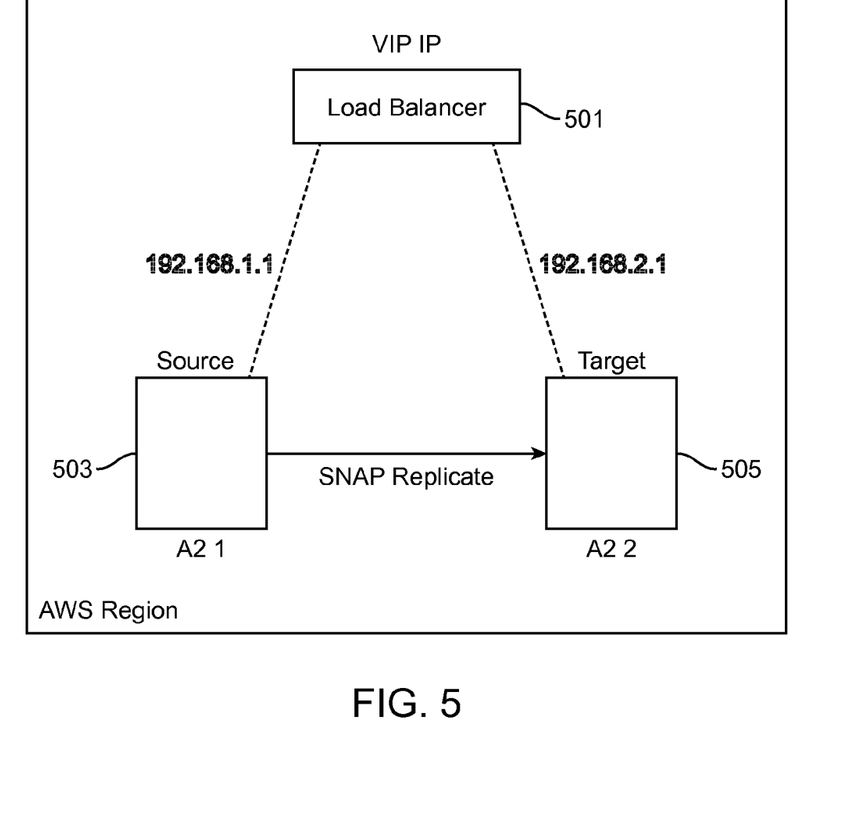
FIG. 5 is an example of a particular implementation according to the present technology.

FIG. 5 illustrates an implementation of a load balancer 501 to replicate relevant information from a first (source) node 503 to a second (target) node 505. Use of a load balancer 501 removes the need for elastic IP addresses and enables operation in private subnet within a Virtual Private Cloud using only private non-routable IP addresses. A load balancer 501 can be used to control traffic being redirected to the source node 503 when the source node 503 is in a healthy state. When a failure is detected the load balancer 501 will redirect traffic to the target node 505 which can then become a new source node in the event of a (subsequent) failure.

Examples within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the scope of the disclosure.

Listing of Code

At least one embodiment works by first defining a specific IAM role to associate to each ec2 Instance. In at least one embodiment, each Instance must be started with 2 ethernet interfaces configured or defined or both.

IAM Role
{"Statement": {"Action": ["ec2:AssignPrivateipAddresses",
"ec2:Describeinstances", "ec2:AssociateAddress",
"ec2:DescribeAddresses", "ec2:AllocateAddress", "ec2:EIPAssociation",
"ec2:DisassociateAddress"], "Effect": "Allow", "Resource":"*" }
]}
In at least one embodiment, the monitoring scripts monitor the elastic IP addresses.

Monitoring Script
Instance_ID='usr/bin/curl --silent http:/1169.254.169.254/latest/meta-data/instance-id'
ENI_ID='/opt/aws/bin/ec2-describe-instances $1nstance_ID --region $REGION $_1$ grep eni -m 1 | awk '{print $2;}"
echo 'date' "--Starting HA monitor"
while [.]; do
pingresult='ping -c 3 -W 1 $HA_Node_IP $_1$ grep time=$_1$ wc -I'
if ["$pingresult" == "0"]; then
echo 'date' "-- HA heartbeat failed, taking over VIP"
/opt/aws/bin/ec2-associate-address -a $AID -n eni-a24a0dc3 --region $REGION -allow reassociation
pingresult='ping -c 1 -W 1 $VIP $_I$ grep time=$_1$ we -I'
if ["$pingresult" == "0" ]; then
echo 'date'"-- Restarting network"
/sbin/service network restart>/dev/null 2>& 1
fi
sleep 60
fi
sleep 2
done
Elastic IP script for failback
root@SoftNAS-1 -]#cat failback.sh
crm resource migrate zfs_services2 SoftNAS-2
/opt/aws/bin/ec2-associate-address -a eipalloc-03a 7 e962 -n eni-46561127 --region us -east-1 --allow-reassociation In at least one embodiment, each instance must have two ethernet interfaces defined.

What is claimed is:

1. A method of switching between a first node and a second node, each located within a virtual private cloud and the first node being located within a first zone and the second node being located within a second zone that is separate from the first zone, the nodes each comprising pools and volumes, the method comprising:
   determining, at the second node, that the first node has experienced a failure to send or receive data, wherein the failure is determined based on a heartbeat;
   creating a new route table at the second node for a virtual private cloud controller, wherein the new route table comprises an internet protocol address of the second node;
   flushing a previous route table on the virtual private cloud controller;
   updating the new route table on the virtual private cloud controller; and
   receiving, at the second node, data from the virtual private cloud controller.

2. The method according to claim 1, further comprising automatically discovering the information present on both nodes necessary to achieve replication, including at least determining which storage pools and volumes need to be replicated, the determination including:
   automatically discovering storage pools on the nodes that have a same name;
   automatically discovering the volumes in each such storage pool;
   automatically configuring tasks necessary for each volume to be replicated;
   automatically determining whether a full back-up or synchronization from the first node to the second node of all storage pools and volumes in the source node is necessary; and
   upon such determination, executing the full back-up or synchronization from the first node to the second node of all storage pools and volumes in the source node.

3. The method of claim 1, further comprising:
   performing a snap replication once per a first predetermined period, the snap replication comprising synchronizing data on the first node to the second node which has changed within a second predetermined period.

4. The method of claim 1, further comprising:
providing access to the first node or the second node via a user-interface.

5. The method of claim 4, wherein the user-interface is an application programming interface.

6. The method of claim 4, wherein the user-interface is a complete packet inspection interface.

7. The method of claim 1, further comprising:
authorizing two-way communication between the nodes via at least one secure shell.

8. The method of claim 1, further comprising:
authorizing two-way communication between the nodes via at least one secure network connection.

9. The method of claim 8, wherein the secure network connection is via TCP/IP.

10. The method of claim 8, wherein the secure network connection is via secure shell.

11. The method of claim 1, wherein the request to a virtual private cloud controller to update an internet protocol address information utilizes a load balancer.

12. The method of claim 1, wherein the second zone is physically separate from first zone.

13. The method of claim 1, wherein the second zone is logically separate from first zone.

14. The method of claim 1, further comprising:
enabling a second port on the second node;
transmitting the request to a virtual private cloud controller to update the new route table with the internet protocol address and with the second port information;
receiving, via the second port, data from the virtual private cloud controller.

15. The method of claim 1, further comprising:
automatically discovering the pools and volumes need to be replicated; and
configuring replication based on the automatic discovery.

16. A method of switching between a first node and a second node, each located within a virtual private cloud and the first node being located within a first zone and the second node being located within a second zone that is physically separate from the first zone, the nodes each comprising pools and volumes, the method comprising:
determining, at the second node, that the first node has experienced a failure to send or receive data, wherein the failure is determined based on a heartbeat;
transmitting, via the second node, a request to a load balancer to update a private non-routable internet protocol address, wherein the update of the private non-routable internet protocol address redirects data to the second node; and
receiving, via the second node, the data from the load balancer.

17. A virtual private cloud configured to be connected to the internet via a hypertext transfer protocol server, the virtual private cloud comprising:
a first server comprising a first network interface card and a second network interface card;
a second server comprising a first network interface card and a second network interface card, the second server configured to be communicatively coupled to the first server to provide for a redundant file system;
the first network interface card on the first server configured to be coupled to the first network interface card on the second server;
the second server configured to:
determine that the first server has experienced a failure to send or receive data by a heartbeat;
create a new route table at the second server for a virtual private cloud controller, wherein the new route table comprises an elastic internet protocol address of the second server;
flush a previous route table on the virtual private cloud controller;
update the new route table on the virtual private cloud controller; and
receive, via the second server, data from the virtual private cloud controller.

* * * * *